(12) United States Patent
Hayashi (10) Patent No.: US 11,551,623 B2
(45) Date of Patent: Jan. 10, 2023

(54) DISPLAY DEVICE AND DISPLAY METHOD

(71) Applicant: Japan Display Inc., Tokyo (JP)

(72) Inventor: Hirotaka Hayashi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/394,550

(22) Filed: Aug. 5, 2021

(65) Prior Publication Data

US 2021/0366415 A1 Nov. 25, 2021

Related U.S. Application Data

(63) Continuation of application No. PCT/JP2019/050673, filed on Dec. 24, 2019.

(30) Foreign Application Priority Data

Feb. 6, 2019 (JP) .............................. JP2019-019791

(51) Int. Cl.
*G09G 3/34* (2006.01)
*G09G 3/36* (2006.01)
(Continued)

(52) U.S. Cl.
CPC ......... *G09G 3/3413* (2013.01); *G09G 3/2022* (2013.01); *G09G 3/36* (2013.01);
(Continued)

(58) Field of Classification Search
CPC .. G09G 3/3648; G09G 3/3413; G09G 3/3614; G09G 3/3406; G09G 3/2022;
(Continued)

(56) References Cited

U.S. PATENT DOCUMENTS

| | | | |
|---|---|---|---|
| 7,358,935 B2 * | 4/2008 | Yamashita | G09G 3/2022 345/82 |
| 10,453,403 B2 * | 10/2019 | Kato | G02F 1/137 |

(Continued)

FOREIGN PATENT DOCUMENTS

| | | |
|---|---|---|
| JP | 2004-333576 A | 11/2004 |
| JP | 2008-304644 A | 12/2008 |

(Continued)

OTHER PUBLICATIONS

International Search Report and Written Opinion dated Mar. 24, 2020, received for PCT Application PCT/JP2019/050673, Filed on Dec. 24, 2019, 10 pages including English Translation.

*Primary Examiner* — Dismery Mercedes
(74) *Attorney, Agent, or Firm* — Xsensus LLP (57) ABSTRACT

According to one embodiment, a display device includes a controller. The controller is configured to control voltages between the common electrode and pixel electrodes in first periods included in one frame period and control an operation of a light source in second periods included in the one frame period. The controller controls, in a first first period of the first periods included in the one frame period, the voltages between the common electrode and the pixel electrodes to write, following an immediately preceding one frame period, a video component of a same color as a color of a video component written by applying voltages between the common electrode and the pixel electrodes in a last first period of the first periods included in the immediately preceding one frame period.

7 Claims, 9 Drawing Sheets

(51) Int. Cl.
  *G02F 1/1334* (2006.01)
  *G02F 1/13357* (2006.01)
  *G09G 3/20* (2006.01)
  *G02F 1/1343* (2006.01)
(52) U.S. Cl.
  CPC ......... *G09G 3/3607* (2013.01); *G09G 3/3614* (2013.01); *G09G 3/3648* (2013.01); *G09G 3/3655* (2013.01); *G02F 1/134336* (2013.01); *G09G 2310/0237* (2013.01); *G09G 2310/08* (2013.01); *G09G 2320/0242* (2013.01)
(58) Field of Classification Search
  CPC ........ G09G 3/36; G09G 3/204; G09G 3/2003; G09G 3/3655; G09G 3/3674; G09G 3/3696; G09G 2310/0235; G09G 2310/08; G09G 2310/0237; G09G 2320/0233; G09G 2320/0626; G09G 2320/0257; G09G 2320/0219; G02F 1/133362; G02F 1/1334; G02F 1/133621; G02F 1/134336; G02F 2201/123
  See application file for complete search history.

(56) References Cited

U.S. PATENT DOCUMENTS

| | | | | |
|---|---|---|---|---|
| 10,504,477 | B2 * | 12/2019 | Kato | G09G 3/3655 |
| 2002/0057243 | A1 * | 5/2002 | Shimomaki | G09G 3/3648 345/87 |
| 2002/0196220 | A1 * | 12/2002 | Sato | G09G 3/342 345/87 |
| 2006/0267889 | A1 * | 11/2006 | Kimura | G09G 3/3258 345/84 |
| 2007/0103425 | A1 * | 5/2007 | Tanaka | G09G 3/3648 345/102 |
| 2007/0222744 | A1 * | 9/2007 | Okita | G09G 3/342 345/102 |
| 2007/0229447 | A1 * | 10/2007 | Takahara | G09G 3/3655 345/102 |
| 2008/0192158 | A1 * | 8/2008 | Yoshihara | G02F 1/13471 349/33 |
| 2008/0239180 | A1 * | 10/2008 | Sekine | G09G 3/3611 349/37 |
| 2010/0231814 | A1 * | 9/2010 | Yamada | G09G 3/3648 345/212 |
| 2012/0176556 | A1 | 7/2012 | Teshima et al. | |
| 2012/0293563 | A1 * | 11/2012 | Akimoto | G09G 3/3413 345/87 |
| 2017/0047021 | A1 * | 2/2017 | Yashiki | G09G 3/34 |
| 2019/0108798 | A1 * | 4/2019 | Ishihara | G09G 3/34 |

FOREIGN PATENT DOCUMENTS

| | | |
|---|---|---|
| JP | 2012-145684 A | 8/2012 |
| JP | 2012-242452 A | 12/2012 |

\* cited by examiner

DISPLAY DEVICE AND DISPLAY METHOD

CROSS-REFERENCE TO RELATED APPLICATIONS

This application is a Continuation Application of PCT Application No. PCT/JP2019/050673, filed Dec. 24, 2019 and based upon and claiming the benefit of priority from Japanese Patent Application No. 2019-019791, filed Feb. 6, 2019, the entire contents of all of which are incorporated herein by reference.

FIELD

Embodiments described herein relate generally to a display device and a display method.

BACKGROUND

In recent years, there has been known a display device that includes a light source, a pair of substrates including pixel electrodes and a common electrode, and a polymer-dispersed liquid crystal layer disposed between the substrates. For example, the polymer-dispersed liquid crystal layer contains a streaky polymer and liquid crystal molecules.

In the polymer-dispersed liquid crystal layer, it is possible to control a tilt of an optical axis of the liquid crystal molecules with respect to an optical axis of the polymer by rotating the liquid crystal molecules by an electric field between each pixel electrode and the common electrode. This makes it possible to control, for each pixel, a degree of scattering of light from the light source and to display an arbitrary video (image) on the display device.

In a display device including a polymer-dispersed liquid crystal layer, display quality is required to be further improved.

DETAILED DESCRIPTION

In general, according to one embodiment, a display device includes a display panel, a light source and a controller. The display panel includes a plurality of pixels arranged in a matrix, a common electrode, pixel electrodes each provided for each of the pixels and a liquid crystal layer. The light source is configured to emit light to the display panel. The controller is configured to control voltages between the common electrode and the pixel electrodes in a plurality of first periods included in one frame period and control an operation of the light source in a plurality of second periods included in the one frame period. The controller controls, in a first first period of the plurality of first periods included in the one frame period, the voltages between the common electrode and the pixel electrodes to write, following an immediately preceding one frame period, a video component of a same color as a color of a video component written by applying voltages between the common electrode and the pixel electrodes in a last first period of a plurality of first periods included in the immediately preceding one frame period.

According to another embodiment, a display method applied to a display device includes: a display panel, the display panel including: a plurality of pixels arranged in a matrix; a common electrode; pixel electrodes each provided for one of the pixels; and a liquid crystal layer including a polymer and liquid crystal molecules; a light source configured to emit light to the display panel; and a controller configured to control voltages between the common electrode and the pixel electrodes in a plurality of first periods included in one frame period and control an operation of the light source in a plurality of second periods included in the one frame period, the display method includes controlling, in a first first period of the plurality of first periods included in the one frame period, the voltages between the common electrode and the pixel electrodes to write, following an immediately preceding one frame period, a video component of a same color as a color of a video component written by applying voltages between the common electrode and the pixel electrodes in a last first period of a plurality of first periods included in the immediately preceding one frame period.

Various embodiments will be described hereinafter with reference to accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

Hereinafter, as an example of the display device, a display device to which a polymer dispersed liquid crystal is applied will be described. The display device of the present embodiment can be used for various devices such as a smartphone, a tablet terminal, and a mobile phone terminal.

Figure 1:
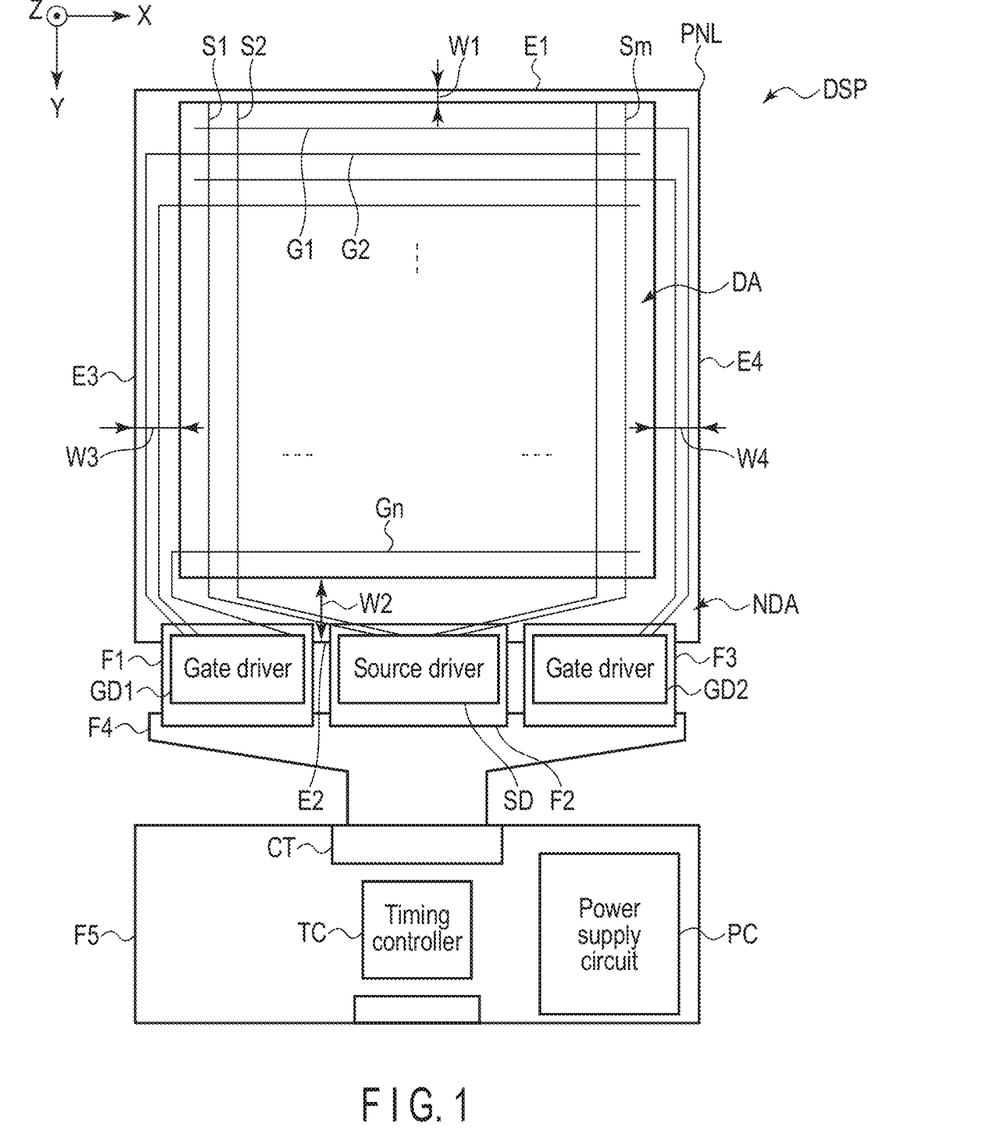
FIG. 1 is a plan view illustrating a configuration example of a display device according to an embodiment.

FIG. 1 is a plan view illustrating a configuration example of a display device DSP according to the present embodiment. In the diagram, a first direction X and a second direction Y are directions crossing each other, and a third direction Z is a direction crossing the first direction X and the second direction Y. In one example, the first direction X, the second direction Y, and the third direction Z are orthogonal to each other, but may intersect one another at angles other than 90 degrees.

The display device DSP includes a display panel PNL, wiring boards F1 to F5, and the like. The display panel PNL includes a display area DA for displaying an image and a frame-shaped non-display area NDA surrounding the display area DA. The display area DA includes a number n of scanning lines G (G1 to Gn), a number m of signal lines S (S1 to Sm), and the like. Note that both n and m are positive integers, and n may be equal to m or may be different from m. The scanning lines G each extend in the first direction X and are arranged in the second direction Y at intervals. The signal lines S each extend in the second direction Y and are arranged in the first direction X at intervals. The display panel PNL has end portions E1 and E2 along the first direction X and end portions E3 and E4 along the second direction Y. With respect to widths of non-display area NDA, a width W1 along the second direction Y between the end portion E1 and the display area DA is smaller than a width W2 along the second direction Y between the end portion E2 and the display area DA. A width W3 between the end portion E3 and the display area DA along the first direction X is equal to a width W4 between the end portion E4 and the display area DA along the first direction X. The widths W3 and W4 are smaller than the width W2. The widths W3 and W4 may be equal to the width W1 or may be different from the width W1.

The wiring boards F1 to F3 are arranged in this order in the first direction X. The wiring board F1 includes a gate driver GD1. The wiring board F2 includes a source driver SD. The wiring board F3 includes a gate driver GD2. The wiring boards F1 to F3 are each connected to the display panel PNL and the wiring board F4. The wiring board F5 includes a timing controller TC, a power supply circuit PC, and the like. The wiring board F4 is connected to a connector CT of the wiring board F5. Note that the wiring boards F1 to F3 may be replaced with a single wiring board. In addition, the wiring boards F1 to F4 may be replaced with a single wiring board. Further, the gate drivers GD and the source driver SD are not limited to those mounted on the wiring boards F1 to F3, and may be located in the non-display area NDA of the display panel PNL to be directly mounted on the display panel PNL.

In the illustrated example, odd-numbered scanning lines from the end portion E1 side are connected to the gate driver GD2, and even-numbered scanning lines are connected to the gate driver GD1, but a connection relation between the gate drivers GD1 and GD2 and the scanning lines is not limited to the illustrated example.

Figure 2:
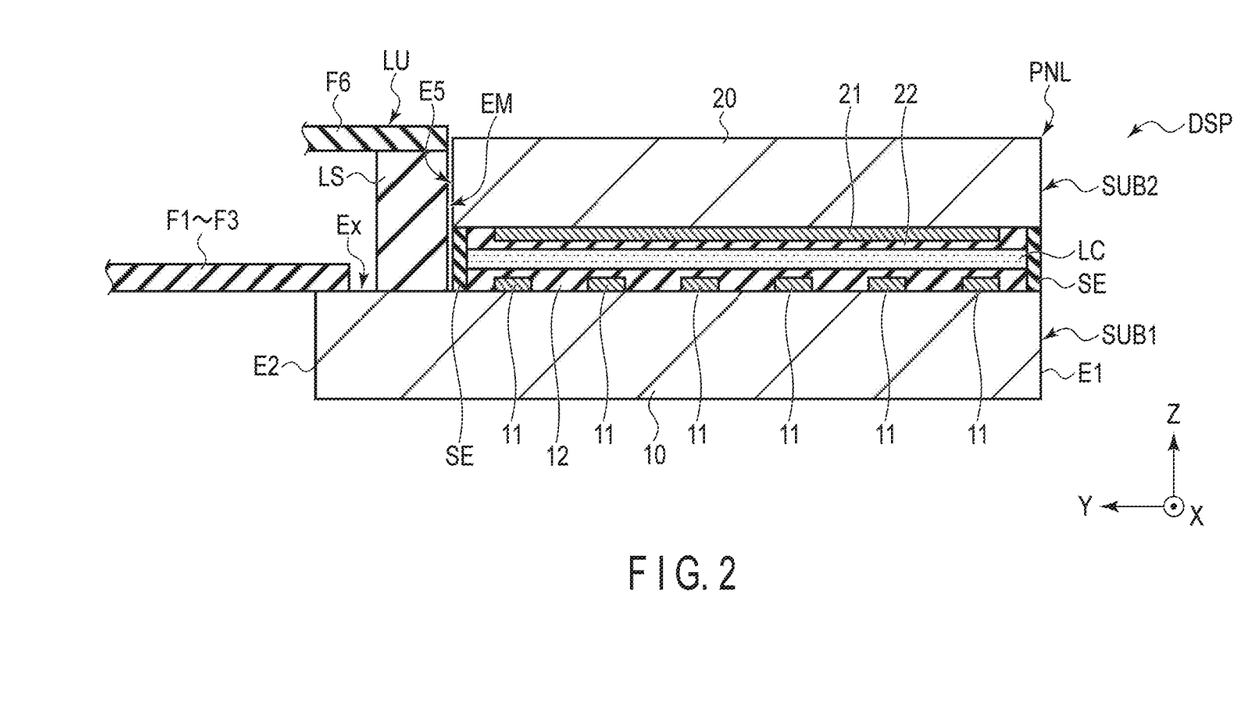
FIG. 2 is a cross-sectional view of the display device illustrated in FIG. 1.

FIG. 2 is a cross-sectional view of the display device DSP illustrated in FIG. 1. Here, only a main part will be described with reference to the cross-section of the display device DSP on a Y-Z plane defined by the second direction Y and the third direction Z.

The display panel PNL includes a first substrate SUB1, a second substrate SUB2, a liquid crystal layer LC, and the like. The first substrate SUB1 includes a transparent substrate 10, pixel electrodes 11, an alignment film 12, and the like. The second substrate SUB2 includes transparent substrate 20, a common electrode 21, an alignment film 22, and the like. The pixel electrodes 11 and the common electrode 21 are made of a transparent conductive material such as indium tin oxide (ITO) or indium zinc oxide (IZO). The liquid crystal layer LC contains a polymer dispersed liquid crystal and is located between the alignment film 12 and the alignment film 22. The first substrate SUB1 and the second substrate SUB2 are bonded to each other with a seal SE. The first substrate SUB1 has an extending portion EX extending in the second direction Y than an end portion E5 of the transparent substrate 20.

The wiring boards F1 to F3 are connected to the extending portion EX of the first substrate SUB1.

A light source unit LU includes a light-emitting element LS, a wiring board F6, and the like. The light-emitting element LS is connected to the wiring board F6 and is located on the extending portion EX. The light-emitting element LS includes a light-emitting portion EM facing the end portion E5. A light emitted from the light-emitting portion EM enters from the end portion E5 and propagates through the display panel PNL.

Figure 3:
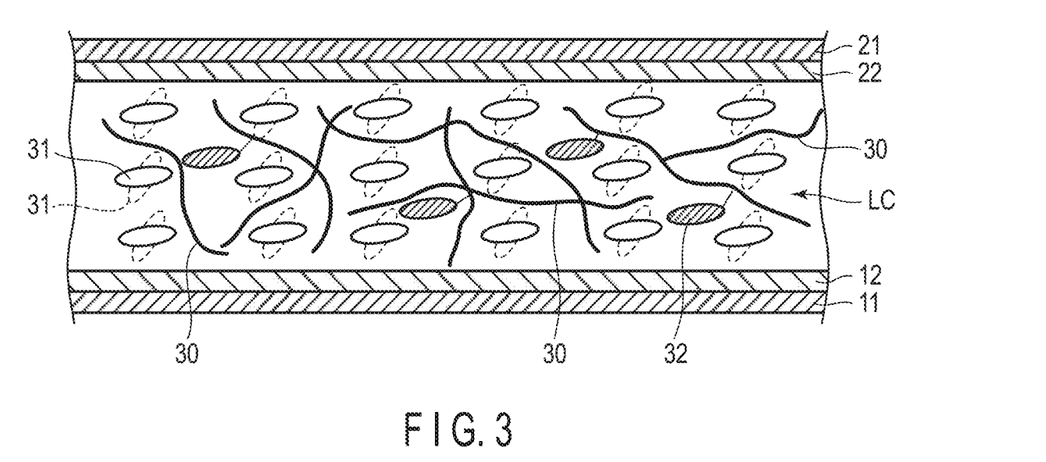
FIG. 3 is a schematic cross-sectional view for describing a configuration of a liquid crystal layer included in the display device illustrated in FIG. 1.

FIG. 3 is a schematic cross-sectional view of the display panel PNL for describing a configuration example of the liquid crystal layer LC. In the present embodiment, the liquid crystal layer LC includes a streaky (network) polymer 30 and liquid crystal molecules 31. In one example, the polymer 30 is a liquid crystalline polymer. The liquid crystal molecules 31 are dispersed in gaps between the polymer 30. As illustrated in FIG. 3, there may be monomer 32 connected to the polymer 30.

Such a liquid crystal layer LC is obtained, for example, by injecting a liquid crystal monomer between the alignment film 12 and the alignment film 22 and then applying ultraviolet light to the liquid crystal monomer aligned in a predetermined direction by an alignment regulating force of the alignment films 12 and 22. As a result, the liquid crystal monomer is polymerized by the ultraviolet light to form the streaky polymer 30.

Each of the polymer 30 and the liquid crystal molecule 31 has optical anisotropy or refractive index anisotropy. Response of the polymer 30 to an electric field is lower than response of the liquid crystal molecules 31 to an electric field. For example, alignment direction of the polymer 30 hardly changes regardless of the electric field between pixel electrode 11 and common electrode 21. On the other hand, alignment directions of the liquid crystal molecules 31 change depending on the electric field.

In FIG. 3, the liquid crystal molecules 31 indicated by solid lines represent an alignment state when there is no potential difference between the pixel electrode 11 and the common electrode 21 (when no electric field is generated). The liquid crystal molecules 31 indicated by broken lines indicate an alignment state when there is a potential difference between the pixel electrode 11 and the common electrode 21 (when an electric field is generated).

In a state where no electric field acts on the liquid crystal layer LC or the electric field is extremely weak, the respective optical axes of the polymer 30 and the liquid crystal molecules 31 are substantially parallel to each other. Therefore, light having entered the liquid crystal layer LC is transmitted in the liquid crystal layer LC while almost not being scattered. Hereinafter, such a state is referred to as a transparent state. In addition, a voltage of the pixel electrode 11 for realizing the transparent state is referred to as a transparent voltage. The transparent voltage may be the same as or slightly different from a common voltage applied to the common electrode 21.

On the other hand, in a state where a sufficient electric field acts on the liquid crystal layer LC, the respective optical axes of the polymer 30 and the liquid crystal molecules 31 cross each other. Therefore, the light entering the liquid crystal layer LC is scattered in the liquid crystal layer LC. Hereinafter, such a state is referred to as a scattering state. In addition, the voltage of the pixel electrode 11 for realizing the scattering state is referred to as a scattering voltage. The scattering voltage creates a larger voltage difference between the pixel electrode 11 and the common electrode 21 than the transparent voltage does. In the present embodiment, a voltage corresponding to each of red, green, and blue video components to be described later corresponds to the scattering voltage.

Note that it takes a slight time after application of the scattering voltage to the pixel electrode 11 for the liquid crystal molecules 31 to transition from the state represented by the solid lines to the state represented by the broken lines in FIG. 3. In other words, a timing at which the scattering voltage is applied to the pixel electrode 11 is slightly different from a timing at which the liquid crystal molecules 31 transition from the state represented by solid lines to the state represented by broken lines (in short, a timing at which the liquid crystal molecules 31 respond to the scattering voltage).

Figure 4:
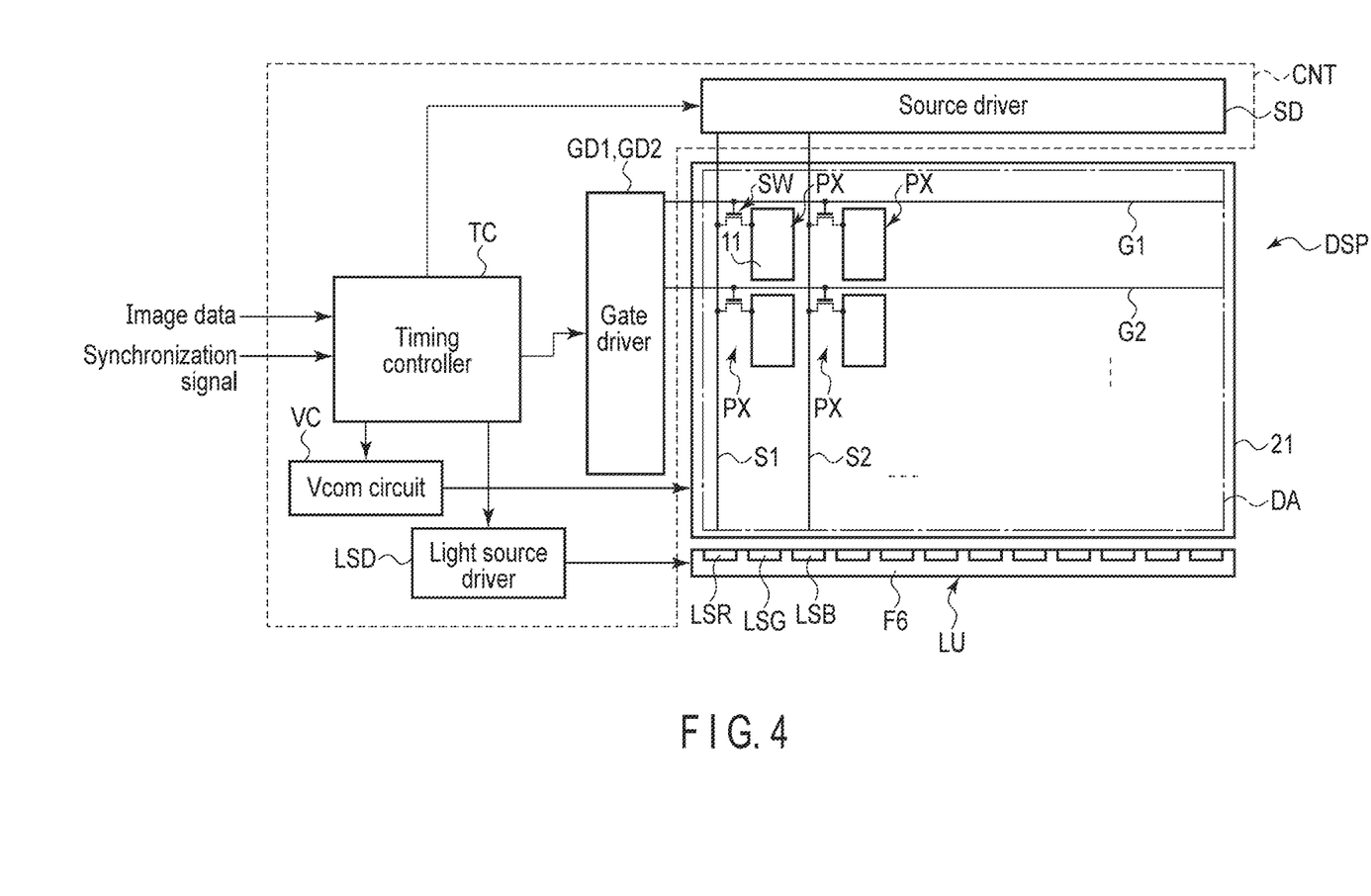
FIG. 4 is a diagram illustrating main components of the display device illustrated in FIG. 1.

FIG. 4 is a diagram illustrating main components of the display device DSP illustrated in FIG. 1.

The display device DSP includes a controller CNT indicated by a dotted line in the diagram. The controller CNT includes a timing controller TC, the gate drivers GD1 and GD2, the source driver SD, a Vcom circuit VC, a light source driver LSD, and the like.

The timing controller TC generates various signals, based on image data, a synchronization signal, and the like that are input from outside. In an example, the timing controller TC outputs to the source driver SD a video component (video signal) generated by performing predetermined signal processing, based on the image data (video data). In addition, the timing controller TC outputs a control signal generated based on the synchronization signal, to each of the gate drivers GD1 and GD2, the source driver SD, the Vcom circuit VC, and the light source driver LSD.

The display area DA, which is indicated by an alternate long and short dashed line in the diagram, includes a plurality of pixels PX. Each pixel PX includes a switching element SW and a pixel electrode 11. The switching element SW is electrically connected to the scanning line G and the signal line S. The switching element SW includes a semiconductor layer, and the semiconductor layer is made of amorphous silicon (a-Si), oxide semiconductor, low-temperature polycrystalline polysilicon (LIPS), or the like. The pixel electrode 11 is connected to the signal line S through the switching element SW.

The common electrode 21 faces the plurality of pixel electrodes 11. Each of the scanning lines G is supplied with a scanning signal from the gate driver GD1 or GD2. Each of the signal lines S is supplied with the video component supplied from the source driver SD. The common electrode 21 is supplied with a common voltage supplied from the Vcom circuit VC. The video component supplied to the signal lines S is supplied to the pixel electrodes 11 connected to the switching elements SW in a period in which the switching elements SW are in a conductive state, based on the scanning signal supplied to the scanning lines G.

In the following description, an operation of supplying the video component to the pixel electrode 11 to form the potential difference between the pixel electrode 11 and the common electrode 21 is referred to as writing the video component (in other words, a voltage corresponding to the video component) in a pixel PX having the pixel electrode 11. Further, in the following description, an operation of setting the voltage of the pixel electrode 11 to the transparent voltage in order to transition the scattering state to the transparent state is referred to, in some cases, as erasing the video component written in the pixel PX having the pixel electrode 11.

The example of FIG. 4 shows the common electrode 21 covering the entire display area DA. However, the following configuration may be used: a plurality of common electrodes 21 each of which is separated for at least one pixel PX are arranged in the display area DA; each common electrode 21 may be connected to a common line, and each common electrode 21 is supplied with the common voltage from the Vcom circuit VC through the common line.

The light source unit LU includes, as the light-emitting element LS, a light-emitting element LSR that emits red light, a light-emitting element LSG that emits green light, and a light-emitting element LSB that emits blue light. As the light-emitting elements LSR, LSG, and LSB, light-emitting diodes (LED) can be used, for example, but the light-emitting elements are not limited to this example. The light source driver LSD controls lighting periods of the light-emitting elements LSR, LSG, and LSB, based on a control signal from the timing controller TC. Note that, in the present embodiment, the display device DSP is driven by a field sequential system, in which video components corresponding to red, green, and blue are written in a time-division manner in one frame period to be described later, and the light-emitting elements corresponding to the colors of the written video components are turned on in a time-division manner.

Figure 5:
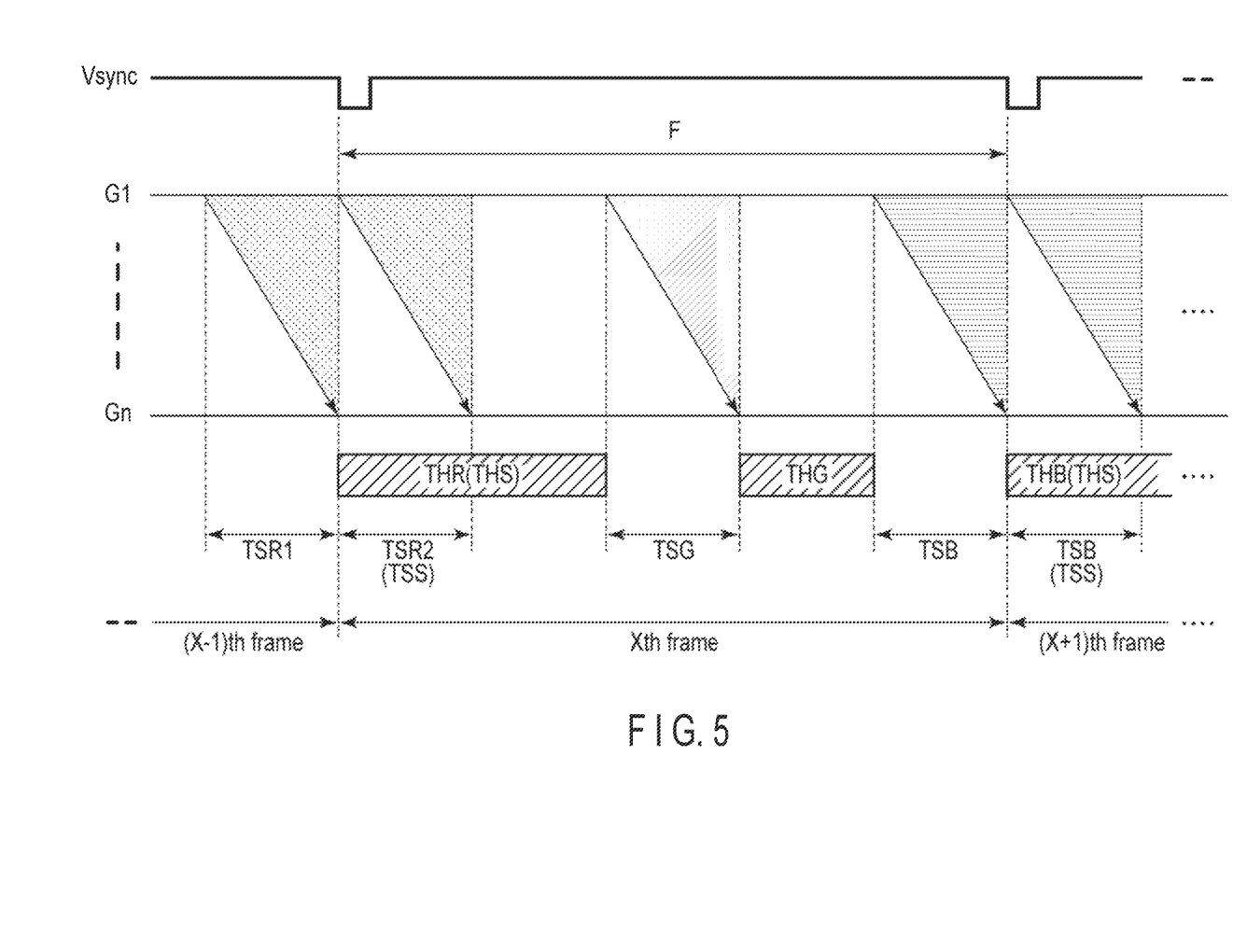
FIG. 5 is a timing chart for describing a display operation of the display device illustrated in FIG. 1.

FIG. 5 is a timing chart illustrating an example of a display operation in the display device DSP according to the present embodiment.

At a start of one frame period F, a vertical synchronization signal Vsync falls. Specifically, in the example of FIG. 5, one frame period F corresponds to a period from when the vertical synchronization signal Vsync falls to when the vertical synchronization signal Vsync falls again. For example, when the display device DSP is driven at 60 Hz, one frame period F is about 16.7 ms.

In the present embodiment, one frame period F includes a plurality of scanning periods TS (first periods) for writing the video component in the pixels PX, and a plurality of holding periods TH (second periods) for holding the video component written in the scanning period TS.

More specifically, one frame period F in the present embodiment includes (1) a target scanning period TSS for writing, in pixels PX, a video component of the same color as that of the last scanning period TS of a plurality of scanning periods TS included in an immediately preceding frame period, (2) a target holding period THS for holding, in a time-division manner, the video component written in the last scanning period TS included in the immediately preceding frame period and the video component written in the target scanning period TSS, (3) a first scanning period TS1 for writing, in the pixels PX, the video component of a color different from that of the target scanning period TSS, and (4) a first holding period TH1 for holding the video component written in the first scanning period TS1, and (5) a second scanning period TS2 for writing, in the pixels PX, the video component of a color different from the color of the target scanning period TSS and from the color of the first scanning period TS1.

The target scanning period TSS, the first scanning period TS1, and the second scanning period TS2 that are included in one frame period F each correspond to any one of the red scanning period TSR for writing a red video component in the pixels PX, the green scanning period TSG for writing a green video component in the pixels PX, and the blue scanning period TSB for writing a blue video component in the pixels PX.

The target holding period THS and the first holding period TH1 included in one frame period F each correspond to any one of the followings: a red holding period THR for holding the red video component written in the red scanning period TSR; a green holding period THG for holding the green video component written in the green scanning period TSG; and a blue holding period THB for holding the blue video component written in the blue scanning period TSB.

Note that, each scanning period TS and each holding period TH included in one frame period F may be referred to as a subframe. In addition, each holding period TH may be referred to as a blanking period.

In FIG. 5, one frame period F includes the target scanning period TSS, the target holding period THS, the first scanning period TS1, the first holding period TH1, and the second scanning period TS2 as described above, without being limited thereto, and, for example, one frame period F may further include a blanking period immediately before the target scanning period TSS, or may further include a blanking period immediately after the second scanning period TS2. Further, one frame period F may further include, for example, a period in which the transparent voltage is applied immediately after each holding period TH to erase the held video component.

Hereinafter, one frame period F will be specifically described, focusing on an Xth frame in FIG. 5.

In the Xth frame, there is first provided, as the target scanning period TSS, a red scanning period TSR2 for writing in the pixels PX a red video component of the same color as the color of the last scanning period TSR1 included in an (X−1)th frame, which is the immediately preceding frame period.

The red scanning period TSR2 includes a number n of horizontal scanning periods, where the number n is the same as the number of the scanning lines G1 to Gn. Note that the horizontal scanning period may also be referred to as a horizontal period. In each horizontal scanning period, the gate drivers GD1 and GD2 sequentially supply scanning signals to the scanning lines G1 to Gn. During the supply of the scanning signal, the source driver SD supplies a voltage (scattering voltage) corresponding to the red video component to each of the signal lines S1 to Sm. More specifically, an operation is repeated in which the signal lines S1 to Sm are simultaneously supplied with tone voltages each corresponding to one of the pixels PX on the line to which the scanning signal is supplied.

By such an operation, the voltage corresponding to the red video component is written between the pixel electrode 11 of each pixel PX and the common electrode 21. A time period taken until the voltages corresponding to the red video component are written in all the pixels PX, in other words, the red scanning period TSR2 is, for example, 3.33 ms.

Further, in the Xth frame, there is provided, as the target holding period THS, a red holding period THR that starts from a timing at which the liquid crystals (liquid crystal molecules 31) start to respond to the red video component written in the last scanning period TSR1 included in the (X−1)th frame, which is the immediately preceding frame period. The target holding period THS overlaps with the target scanning period TSS.

For the sake of convenience of description, FIG. 5 illustrates, as an example, a case where the target scanning period TSS and the target holding period THS are started at the same timing. However, the timing at which the target holding period THS is started is the timing at which the liquid crystal starts to respond to the red video component written in the scanning period TSR1, without being limited to the timing in FIG. 5.

In the red holding period THR, the red light-emitting element LSR is turned on. By this operation, the display area DA displays a red video (image) corresponding to the red video component written in the last scanning period TSR1 included in the (X−1)th frame and to the red video component written in red scanning period TSR2, which is the target scanning period TSS. Note that the time period in which the red video is displayed in the display area DA, in other words, the red holding period THR is, for example, 6.66 (=3.33×2) ms.

In the Xth frame, following the target holding period THS (in this case, the red holding period THR), the green scanning period TSG is provided as the first scanning period TS1 for writing the video component of a color different from the color of the red scanning period TSR2, which is the target scanning period TSS.

Note that, FIG. 5 illustrates, as an example, a case where the green scanning period TSG is provided as the first scanning period TS1, without being limited thereto; and since the first scanning period TS1 only has to be a period for writing the video component of a color different from the color of the target scanning period TSS (in this case, the red scanning period TSR2), the blue scanning period TSB may be provided as the first scanning period TS1. In this case, the green scanning period TSG is provided as the second scanning period TS2 to be described later.

As with the case of the red scanning period TSR2, the green scanning period TSG includes the number n of horizontal scanning periods, where the number n is the same as the number of the scanning lines G1 to Gn. In each horizontal scanning period, the gate drivers GD1 and GD2 sequentially supply scanning signals to the scanning lines G1 to Gn. During the supply of the scanning signal, the source driver SD supplies a voltage corresponding to the green video component to each of the signal lines S1 to Sm.

By such an operation, the voltage corresponding to the green video component is written between the pixel electrode 11 of each pixel PX and the common electrode 21. A time period taken until the voltages corresponding to the green video component are written in all the pixels PX, in other words, the green scanning period TSG is, for example, 3.33 ms as with the case of the red scanning period TSR2.

Note that the light-emitting element LS is turned off during the first scanning period TS1.

In the Xth frame, following first scanning period TS1 (in this case, the green scanning period TSG), the green holding period THG is provided as the first holding period TH1 for holding the green video component written in the first scanning period TS1.

In the green holding period THG, the green light-emitting element LSG is turned on. By this operation, the display area DA displays the green video corresponding to the green video component written in the green scanning period TSG, which is the first scanning period TS1. Note that the time period in which the green video is displayed in the display area DA, in other words, the green holding period THG is, for example, 3.33 ms.

In the Xth frame, following the first holding period TH1 (in this case, the green holding period THG), the blue scanning period TSB is provided as the second scanning period TS2 for writing the video component of a color different from the color of the target scanning period TSS and from the color of the first scanning period TS1. The blue scanning period TSB is also provided as the last scanning period TS included in the Xth frame.

As with the case of the red scanning period TSR2 and the green scanning period TSG, the blue scanning period TSB includes the number n of horizontal scanning periods, where the number n is the same as the number of the scanning lines G1 to Gn. In each horizontal scanning period, the gate drivers GD1 and GD2 sequentially supply scanning signals to the scanning lines G1 to Gn. In addition, during the supply of the scanning signal, the source driver SD supplies a voltage corresponding to the blue video component to each of the signal lines S1 to Sm.

By such an operation, the voltage corresponding to the blue video component is written between the pixel electrode 11 of each pixel PX and the common electrode 21. The time taken until the voltage corresponding to the blue video component is written in all the pixels PX, in other words, the blue scanning period TSB is, for example, 3.33 ms as with the case of the red scanning period TSR2 and the green scanning period TSG.

Note that the light-emitting element LS is turned off during the second scanning period TS2.

At the start of an (X+1)th frame, which is the next frame period of the Xth frame, there is provided, as the target scanning period TSS in the (X+1)th frame, the blue scanning period TSB for writing the video component of the same color as the color of the blue scanning period TSB, which is the last scanning period TS of the Xth frame. In the (X+1)th frame, there is provided, as the target holding period THS, the blue holding period THB overlapping with the blue scanning period TSB, which is the target scanning period TSS.

Figure 6:
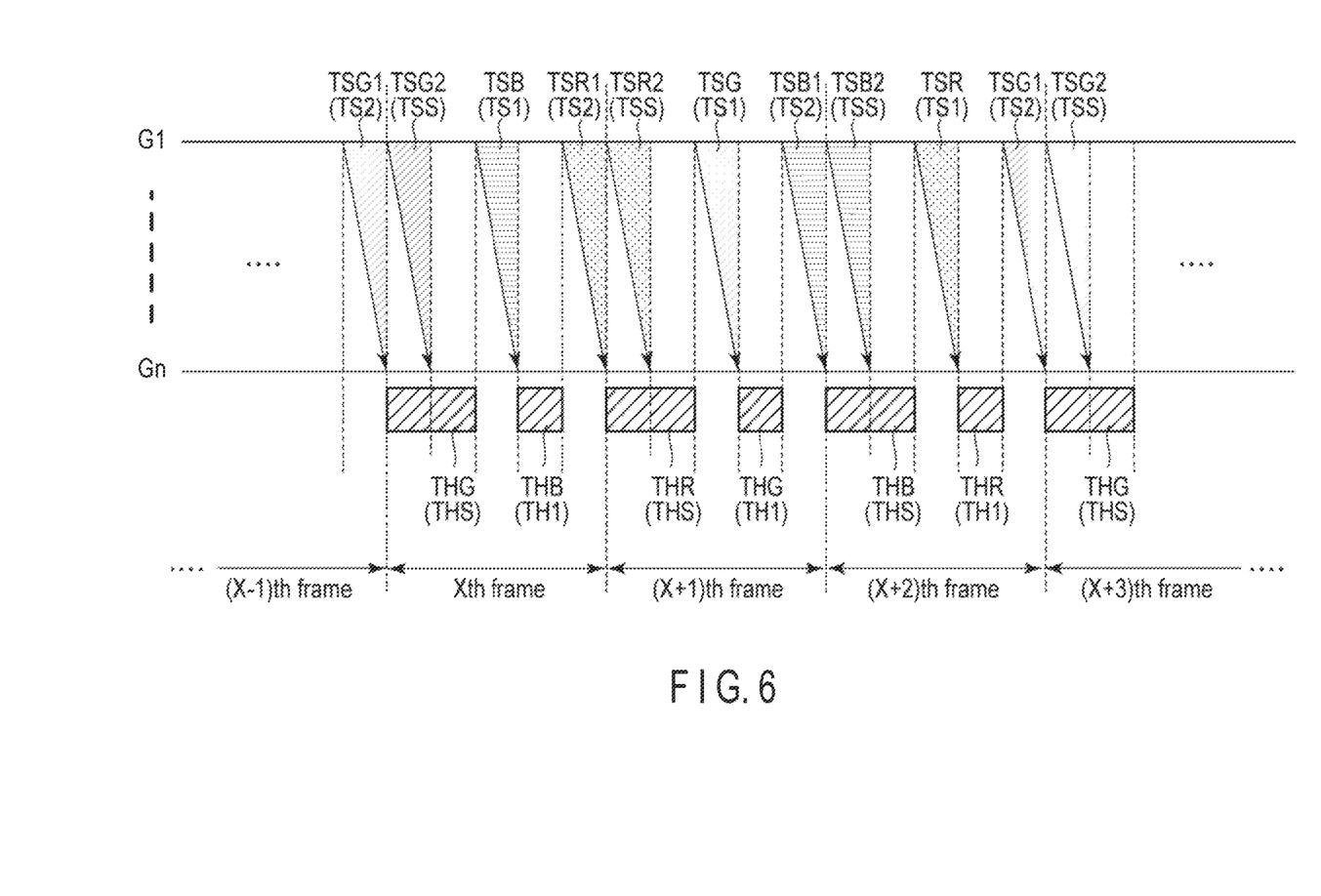
FIG. 6 is a timing chart for describing a display operation of the display device illustrated in FIG. 1.

FIG. 6 illustrates a timing chart in a case where the display operation in the display device DSP illustrated in FIG. 5 is performed over a plurality of frames.

First, in the Xth frame, there is provided, as the target scanning period TSS, the green scanning period TSG2 for writing in the pixels PX the green video component of the same color as the color of the last scanning period TSG1 included in the (X−1)th frame, which is the immediately preceding frame period.

Further, in the Xth frame, there is provided, as the target holding period THS, the green holding period THG that starts from a timing at which the liquid crystal starts to respond to the green video component written in the last scanning period TSG1 included in the (X−1)th frame, which is the immediately preceding frame period. As illustrated also in FIG. 5, the target holding period THS overlaps with the target scanning period TSS (in this case, the green scanning period TSG).

In the Xth frame, following the target holding period THS (in this case, the green holding period THG), the blue scanning period TSB is provided as the first scanning period TS1 for writing the video component of a color different from the color of the green scanning period TSG2, which is the target scanning period TSS.

In the Xth frame, following first scanning period TS1 (in this case, the blue scanning period TSB), the blue holding period THB is provided as the first holding period TH1 for holding the blue video component written in the first scanning period TS1.

In the Xth frame, following the first holding period TH1 (in this case, the blue holding period THB), the red scanning period TSR1 is provided as the second scanning period TS2 for writing the video component of a color different from the color of the target scanning period TSS and from the color of the first scanning period TS1. The red scanning period TSR1 corresponds to the last scanning period TS in the Xth frame.

Next, in the (X+1)th frame, there is provided, as the target scanning period TSS, the red scanning period TSR2 for writing in the pixels PX a red video component of the same color as the color of the last scanning period TSR1 included in the Xth frame, which is the immediately preceding frame period.

Further, in the (X+1)th frame, there is provided, as the target holding period THS, a red holding period THR that starts from a timing at which the liquid crystal starts to respond to the red video component written in the last scanning period TSR1 included in the Xth frame, which is the immediately preceding frame period. As with the case of the Xth frame, the target holding period THS (in this case, the red holding period THR) in the (X+1)th frame overlaps with the target scanning period TSS (in this case, the red scanning period TSR2).

In the (X+1)th frame, following the target holding period THS (in this case, the red holding period THR), the green scanning period TSG is provided as the first scanning period TS1 for writing the video component of a color different from the color of the red scanning period TSR2, which is the target scanning period TSS (and of the same color as the color of the target scanning period TSS in the Xth frame, which is the immediately preceding frame period).

In the (X+1)th frame, following the first scanning period TS1 (in this case, the green scanning period TSG), the green holding period THG is provided as the first holding period TH1 for holding the green video component written in the first scanning period TS1.

In the (X+1)th frame, following the first holding period TH1 (in this case, the green holding period THG), the blue scanning period TSB1 is provided as the second scanning period TS2 for writing the video component of a color different from the color of the target scanning period TSS and from the color of the first scanning period TS1. This blue scanning period TSB1 corresponds to the last scanning period TS in the (X+1)th frame.

Next, in an (X+2)th frame, there is provided, as the target scanning period TSS, the blue scanning period TSB2 for writing in the pixels PX the blue video component of the same color as the color of the last scanning period TSB1 included in the (X+1)th frame, which is the immediately preceding frame period.

Further, in the (X+2)th frame, there is provided, as the target holding period THS, the blue holding period THB that starts from a timing at which the liquid crystal starts to respond to the blue video component written in the last scanning period TSB1 included in the (X+1)th frame, which is the immediately preceding frame period. As with the case of the Xth frame and the (X+1)th frame, the target holding period THS (in this case, the blue holding period THB) in the (X+2)th frame overlaps with the target scanning period TSS (in this case, the blue scanning period TSB2).

In the (X+2)th frame, following the target holding period THS (in this case, the blue holding period THB), the red scanning period TSR is provided as the first scanning period TS1 for writing the video component of a color different from the color of the blue scanning period TSB2, which is the target scanning period TSS (and of the same color as the color of the target scanning period TSS in the (X+1)th frame, which is the immediately preceding frame period).

In the (X+2)th frame, following first scanning period TS1 (in this case, the red scanning period TSR), the red holding period THR is provided as the first holding period TH1 for holding the red video component written in the first scanning period TS1.

In the (X+2)th frame, following the first holding period TH1 (in this case, the red holding period THR), the green scanning period TSG1 is provided as the second scanning period TS2 for writing the video component of a color different from the color of the target scanning period TSS and from the color of the first scanning period TS1. The green scanning period TSG1 corresponds to the last scanning period TS in the (X+2)th frame. A configuration of the (X−1)th frame is the same as a configuration of the (X+2)th frame.

Also in an (X+3)th frame and subsequent frames, the same display operation as the display operation in the Xth frame, the (X+1)th frame, and the (X+2)th frame described above is repeatedly performed.

Next, effects of the display device DSP according to the present embodiment will be described using a first comparative example and a second comparative example. Note that the first comparative example and the second comparative example are merely for describing part of advantageous effects provided by the display device DSP according to the present embodiment, and configurations and effects common to the comparative examples and the present embodiment are not excluded from a scope of the present invention.

Figure 7:
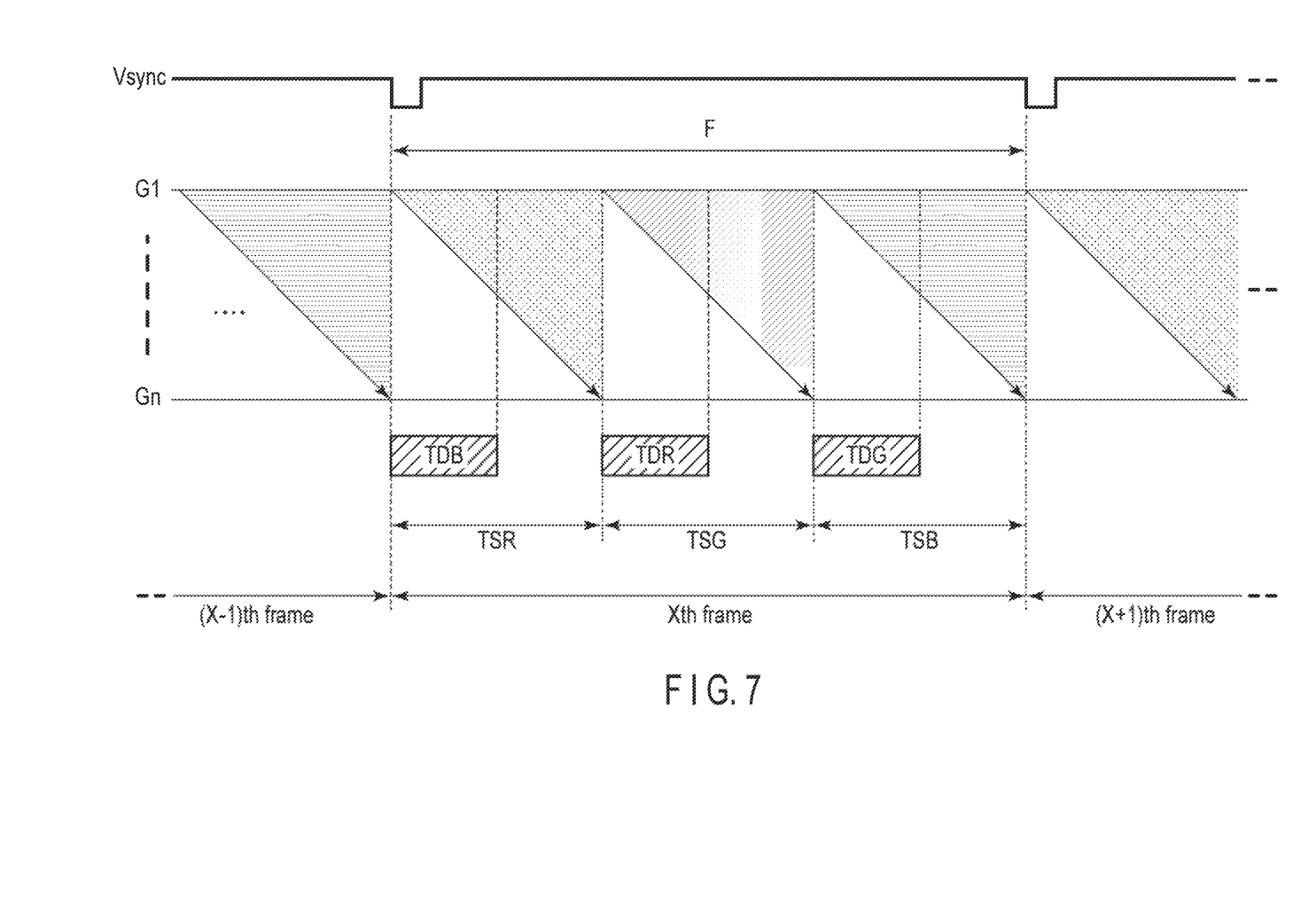
FIG. 7 is a timing chart for describing a first comparative example to the display operation illustrated in FIG. 5.

FIG. 7 is a timing chart illustrating an example of the display operation according to the first comparative example.

One frame period F according to the first comparative example includes, as shown in the Xth frame: a blue display period TDB for displaying a video corresponding to a blue video component written in an immediately preceding frame period; a red scanning period TSR for writing a red video component in the pixels PX; a red display period TDR for displaying a video corresponding to the red video component written in the red scanning period TSR; a green scanning period TSG for writing a green video component in the pixels PX; a green display period TDG for displaying a video corresponding to the green video component written in the green scanning period TSG; and a blue scanning period TSB for writing a blue video component in the pixels PX.

The blue light-emitting element LSB is turned on in the blue display period TDB, the red light-emitting element LSR is turned on in the red display period TDR, and the green light-emitting element LSG is turned on in the green display period TDG.

As illustrated in FIG. 7, the blue display period TDB and the red scanning period TSR overlap with each other. The red display period TDR and the green scanning period TSG overlap with each other. The green display period TDG and the blue scanning period TSB overlap with each other.

In the case of the display operation illustrated in FIG. 7, each of the scanning periods TSR, TSG, and TSB is 5.55 ms, for example. In addition, each of the display periods TDR, TDG, and TDB is 2.78 ms, for example.

In the case of the display operation according to the first comparative example, as illustrated in FIG. 7, while the light-emitting element LS corresponding to the color of the video component written in the immediately preceding scanning period TS is turned on, the video component of another color is written in the pixels PX; therefore, there occurs a phenomenon called "color breakup" in which the color of a video displayed in the display area DA is not correct. This color breakup phenomenon deteriorates display quality of the display device DSP and is not a preferable phenomenon.

In contrast, in the case of the display operation according to the present embodiment, as illustrated in FIGS. 5 and 6, while the light-emitting element LS corresponding to the color of the video component written in the immediately preceding scanning period TS is turned on, either the video component is not written in the pixels PX or the video component of the same color as that of the lit light-emitting element LS is written in the pixels PX. Therefore, there is no difference between the color of the turned-on light-emitting element LS and the color of the video component written in the pixels PX. With this arrangement, an occurrence of the color breakup can be suppressed.

Figure 8:
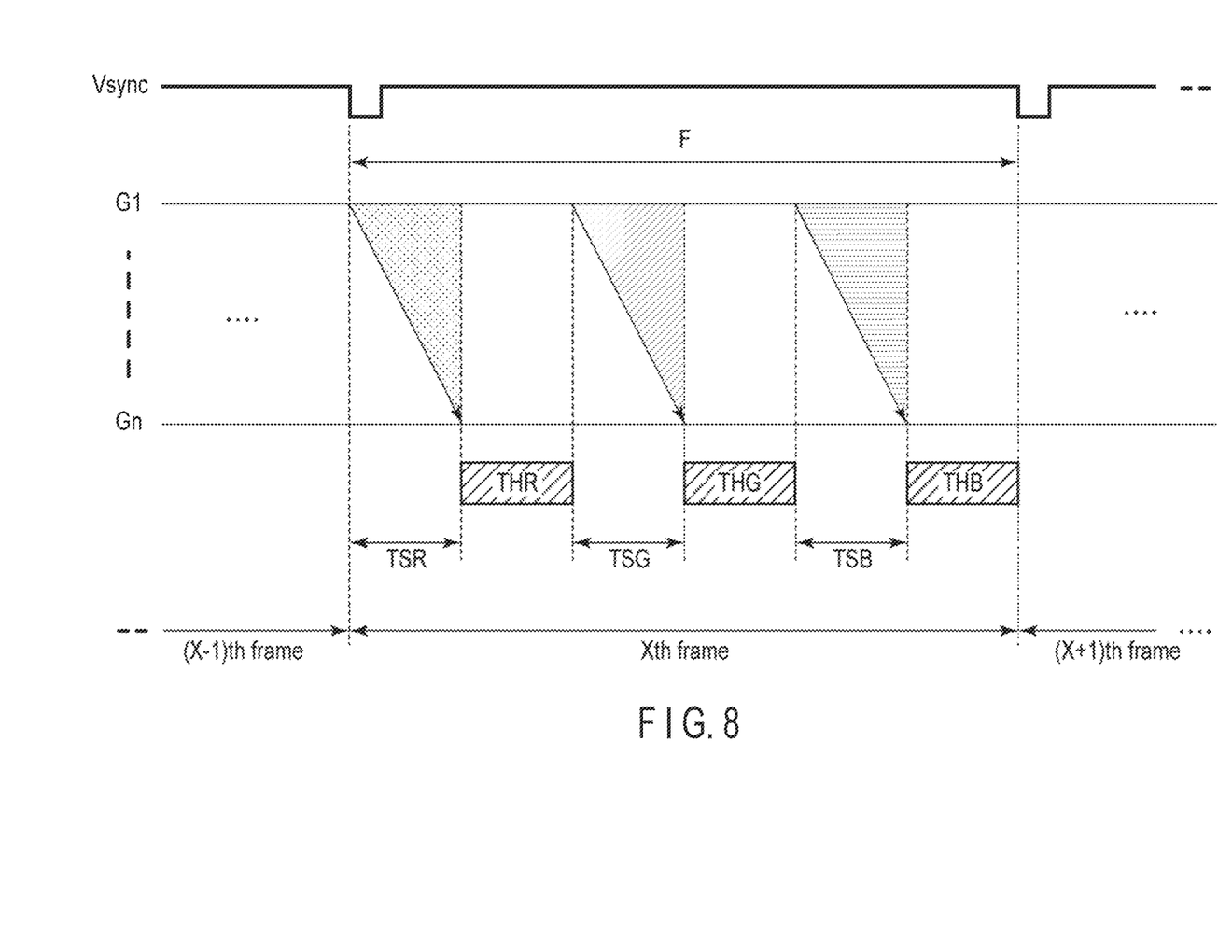
FIG. 8 is a timing chart for describing a second comparative example to the display operation illustrated in FIG. 5.

FIG. 8 is a timing chart illustrating an example of the display operation according to the second comparative example.

In one frame period F according to the second comparative example, the scanning period TS for writing in the pixels PX the video component corresponding to each color and the holding period TH for holding the video component corresponding to each color written in the pixels PX are provided so as not to overlap with each other. Specifically, as shown in the Xth frame, one frame period F according to the second comparative example includes: the red scanning period TSR, the red holding period THR, a green scanning period TSG, the green holding period THG, the blue scanning period TSB, and the blue holding period THB; and each scanning period TS and each holding period TH corresponding to one of the colors are arranged in order.

Note that FIG. 8 illustrates the case where the scanning periods TS and the holding periods TH are arranged in order of red, green, and blue; however, the arrangement order is not limited thereto, and the order of the colors may be arbitrary. For example, in one frame period F, the scanning periods TS and the holding periods TH may be arranged in order of green, blue, and red, or may be arranged in order of blue, red, and green.

In the case of the display operation illustrated in FIG. 8, each of the scanning periods TSR, TSG, and TSB and each of the holding periods THR, THG, and THB are 2.78 ms, for example.

In the case of the display operation according to the second comparative example, as illustrated in FIG. 8, the light-emitting element LS corresponding to each of the colors is turned on only in the holding period TH corresponding to each color and is turned off in the scanning period TS corresponding to each color. Therefore, while the light-emitting element LS corresponding to the color of the video component written in the immediately preceding scanning period TS is turned on, the video component of another color is not written in the pixels PX, and the occurrence of the color breakup can therefore be suppressed.

On the other hand, in the case of the display operation according to the second comparative example, it is necessary to provide the scanning period TS and the holding period TH corresponding to each color so as not to overlap with each other. Therefore, when the display device DSP is driven at 60 Hz, an upper limit of time that can be allocated to each of the scanning periods TSR, TSG, and TSB is 2.78 ms, which is one-sixth of one frame period F as described above. With this arrangement, for example, in a case where the number of scanning lines G provided in the display device DSP increases and thereby increasing a drive load, there is a disadvantage that it is impossible to sufficiently obtain a time period enough for the video component corresponding to each color to be written in the pixels PX. Therefore, there is a disadvantage that it is impossible to increase a size and a resolution of the display area DA provided in the display device DSP.

In contrast, in the case of the display operation according to the present embodiment, since one frame period F is configured to include the target scanning period TSS and the target holding period THS, it is possible to omit the period corresponding to the blue holding period THB illustrated in FIG. 8. With this arrangement, since one frame period F can be divided into five instead of six, in a case where the display device DSP is driven at 60 Hz, the allocatable time for each of the scanning periods TSR, TSG, and TSB can be increased (changed) from 2.78 ms to 3.33 ms. Therefore, even if the number of scanning lines G provided in the display device DSP increases and the driving load accordingly increases, it is possible to sufficiently secure the time for writing the video component corresponding to each color in the pixels PX, and it is possible to increase the size and the resolution of the display area DA provided in the display device DSP.

In addition, in the case of the display operation according to the present embodiment, it is possible to lengthen not only the scanning periods TSR, TSG, and TSB but also the holding periods THR, THG, and THB as compared with the display operation according to the second comparative example, so that it is possible to further increase a luminance of the pixels PX in which the video component corresponding to each color is written. As a result, it is possible to provide a brighter video to the user as compared with the case where the display operation according to the second comparative example is performed.

Further, in the case of the display operation according to the present embodiment, since the holding periods THR, THG, and THB can be made longer than those in the display operation according to the second comparative example as described above, even if a light intensity of the light-emitting element LS is reduced, it is possible to achieve a luminance equivalent to that in the case of the display operation according to the second comparative example. As a result, it is possible to save power by an amount of power corresponding to the reduced light intensity of the light-emitting element LS.

Here, another effect obtained by the display operation according to the present embodiment will also be described with reference to FIG. 9. FIG. 9(a) illustrates the display operation according to the second comparative example, and FIG. 9(b) illustrates the display operation according to the present embodiment. The display operation according to the present embodiment illustrated in FIG. 9(b) is different from the case illustrated in FIGS. 5 (and 6) in that a duration of the scanning period TS included in one frame period F is not 3.33 ms as illustrated in FIGS. 5 (and 6) but 2.78 ms as with the case of the display operation according to the second comparative example.

Figure 9:
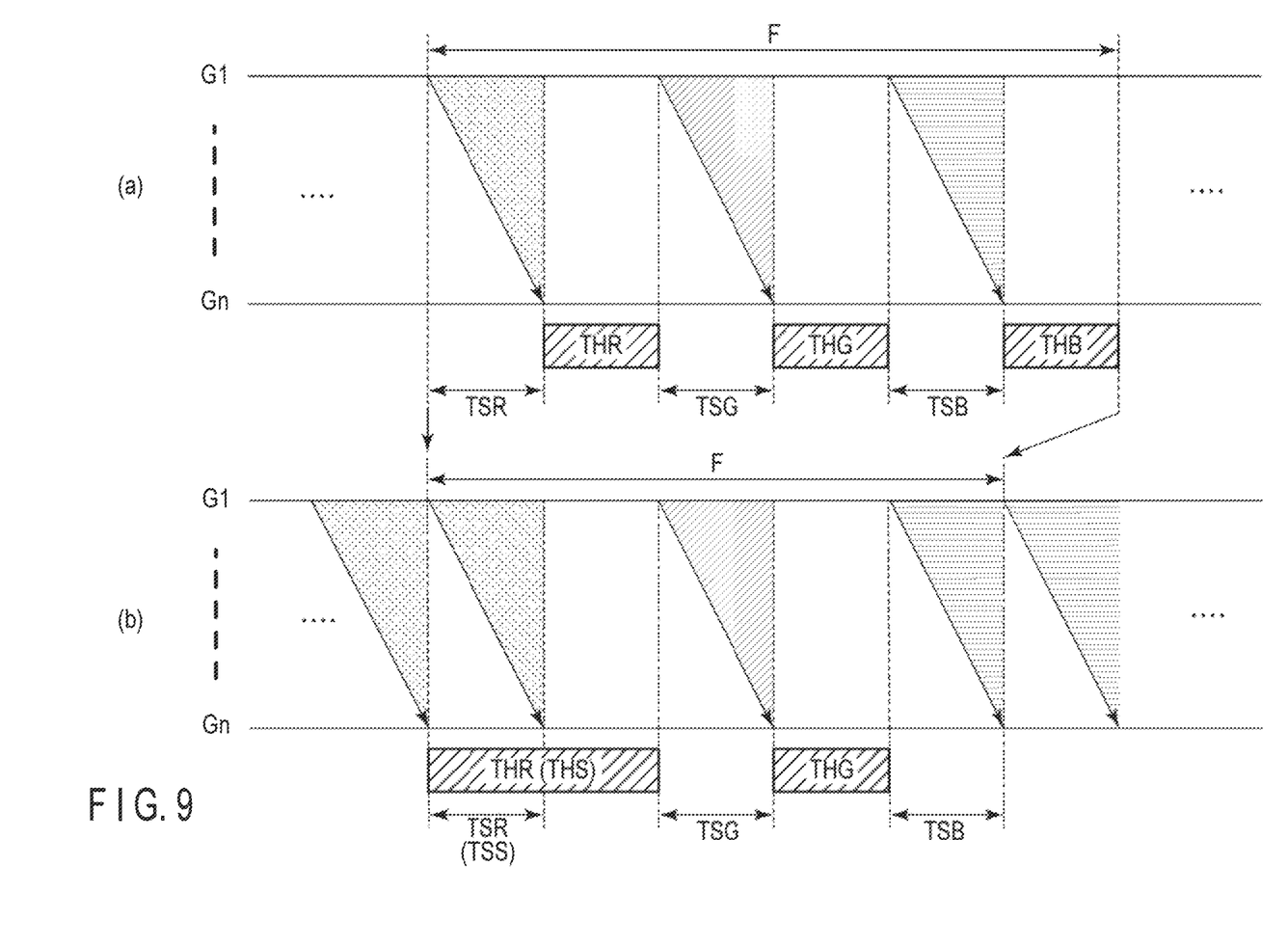
FIG. 9 is another timing chart for describing the display operation of the display device illustrated in FIG. 1.

For example, in the case where a size of the display area DA provided in the display device DSP can be sufficiently driven by the display operation according to the second comparative example, in other words, in the case where the time period 2.78 ms is enough to write in the pixels PX the video component corresponding to each color, since the period corresponding to the blue holding period THB illustrated in FIG. 9(a) can be omitted in the display operation according to the present embodiment as illustrated in FIG. 9(b), one frame period F can be shortened as compared with the display operation according to the second comparative example. That is, by the display operation according to the present embodiment, it is possible to improve the frame rate by about 1.2 times as compared with the case of the second comparative example, and a video display performance can therefore be expected to be improved.

With the embodiment described above, it is possible to improve the display quality of a display device including a polymer-dispersed liquid crystal layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display method applied to a display device that includes: a display panel, the display panel including: a plurality of pixels arranged in a matrix; a common electrode; pixel electrodes each provided for one of the pixels; and a liquid crystal layer including a polymer and liquid crystal molecules; a light source configured to emit light to the display panel; and a controller circuit configured to control voltages between the common electrode and the pixel electrodes in three of first periods included in an Xth frame period and control an operation of the light source in two of second periods included in the Xth frame period, the display method comprising:

controlling, in a first first period of the three of first periods included in the Xth frame period, the voltages between the common electrode and the pixel electrodes to write, following an (X−1)th frame period, which is an immediately preceding Xth frame period, a video component of a same color as a color of a video component written by applying voltages between the common electrode and the pixel electrodes in a last first period of a plurality of first periods included in the (X−1)th frame period, the second periods of the Xth frame period have only two of second periods, the two of the second periods are a first color holding period and a second color holding period, a first color of the first color holding period is a different color from a second color of the second color holding period, the first color holding period is longer than the second color holding period, the three of the first periods are a first color scanning period, a second color scanning period and a third color scanning period, the first first period is the first color scanning period, the second color scanning period is a next first color scanning period, the third color scanning period is a next second color scanning period, the first color scanning period overlaps the first color holding period, in the Xth frame period, a part of the first color holding period is between the first color scanning period and the second color scanning period, the second color scanning period does not overlap the second color holding period, in the Xth frame period, and the second color holding period is between the second color scanning period and the third color scanning period, in the Xth frame.

2. The display method of claim 1, further comprising:
controlling an operation of the light source to turn on, in the first color holding period included in the Xth frame period, a light source of a color corresponding to the video component written in the last first period included in the (X−1)th frame period and corresponding to the video component written in the first color scanning period included in the Xth frame period.

3. The display method of claim 2, further comprising:
controlling, in the second color scanning period located next to the first color scanning period included in the Xth frame period, the voltages between the common electrode and the pixel electrodes to write a video component of a color different from the color of the first color scanning period.

4. The display method of claim 3, further comprising:
controlling the operation of the light source to turn off, in the second color scanning period included in the Xth frame period, the light source turned on in the first color holding period in the Xth frame period.

5. The display method of claim 4, further comprising:
after the second color scanning period included in the Xth frame period is finished, controlling the operation of the light source to turn on, in the second color holding period located next to the first color holding period, a light source of a color corresponding to the video component written in the second color scanning period.

6. The display method of claim 5, further comprising:
controlling, in the third color scanning period, the voltages between the common electrode and the pixel electrodes to write a video component of a color different from the color of the first color scanning period and from the color of the second color scanning period.

7. The display method of claim 6, further comprising:
controlling the operation of the light source to turn off, in the third color scanning period included in the Xth frame period, the light source turned on in the second color holding period.

* * * * *